United States Patent
Chen et al.

(10) Patent No.: US 9,569,457 B2
(45) Date of Patent: Feb. 14, 2017

(54) DATA PROCESSING METHOD AND APPARATUS FOR DISTRIBUTED SYSTEMS

(71) Applicant: International Business Machines Corporation, Armonk, NY (US)

(72) Inventors: Guan Cheng Chen, Beijing (CN); Jian Li, Austin, TX (US); Xin Li, Beijing (CN); Yan Li, Beijing (CN); Qiming Teng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 14/052,826

(22) Filed: Oct. 14, 2013

(65) Prior Publication Data

US 2014/0122429 A1    May 1, 2014

(30) Foreign Application Priority Data

Oct. 31, 2012    (CN) .......................... 2012 1 0429531

(51) Int. Cl.
*G06F 7/00* (2006.01)
*G06F 17/30* (2006.01)
*G06F 11/20* (2006.01)

(52) U.S. Cl.
CPC ... *G06F 17/30174* (2013.01); *G06F 17/30082* (2013.01); *G06F 17/30194* (2013.01); *G06F 11/2094* (2013.01)

(58) Field of Classification Search
None
See application file for complete search history.

(56) References Cited

U.S. PATENT DOCUMENTS

| 6,029,168 | A  | * | 2/2000  | Frey |
|---|---|---|---|---|
| 6,484,143 | B1 | * | 11/2002 | Swildens ................ H04L 12/14  705/1.1 |
| 6,487,561 | B1 | * | 11/2002 | Ofek et al. |
| 7,054,910 | B1 | * | 5/2006  | Nordin ................ G06F 11/2094  707/999.202 |
| 7,617,303 | B2 | * | 11/2009 | Duggirala ..................... 709/223 |
| 7,747,581 | B1 |   | 6/2010  | Li et al. |

(Continued)

FOREIGN PATENT DOCUMENTS

| CN | 101371238 A | 2/2009 |
|---|---|---|
| CN | 102004769 A | 4/2011 |

OTHER PUBLICATIONS

Ananthanarayanan et al., "Cloud analytics: Do we really need to reinvent the storage stack?", Proceedings of the 2009 conference on Hot topics in cloud computing, Article No. 15, 2009, ACM.*

(Continued)

*Primary Examiner* — Michael Hicks
(74) *Attorney, Agent, or Firm* — Cantor Colburn LLP; Keivan Razavi

(57) ABSTRACT

A data processing method for a distributed system, the distributed system comprising a master storage node and multiple slave storage nodes, includes: storing, responsive to a request for writing a data file, multiple replications of the data file on the multiple slave storage nodes, each of the replications being segmented into data blocks of a same size, wherein the sizes of the segmented data blocks of at least two replications are different; and storing distribution information of the multiple replications.

14 Claims, 3 Drawing Sheets

(56) References Cited

U.S. PATENT DOCUMENTS

| | | |
|---|---|---|
| 7,962,779 B2 | 6/2011 | Patel et al. |
| 2008/0320097 A1 | 12/2008 | Sawicki et al. |
| 2011/0258378 A1 | 10/2011 | Ananthanarayanan et al. |
| 2012/0185437 A1 | 7/2012 | Pavlov et al. |

OTHER PUBLICATIONS

Peng et al., "Implementation Issues of A Cloud Computing Platform", Bulletin of the IEEE Computer Society Technical Committee on Data Engineering, 2009, IEEE.*

Jeffrey Shafer, et al., "The Hadoop Distributed Filesystem: Balancing Portability and Performance," IEEE International Symposium on Performance Analysis of Systems & Software (ISPASS), Mar. 2010, pp. 1-12.

Chinese Office Action dated Jun. 3, 2016; for CN Application No. 201210429531.3; 5 pgs.

Chinese Office Action Search Report mailed Jun. 3, 2016 for CN Application No. 2012104295313; 2 pgs.

\* cited by examiner

DATA PROCESSING METHOD AND APPARATUS FOR DISTRIBUTED SYSTEMS

PRIORITY

This application claims priority to Chinese Patent Application No. 201210429531.3, filed Oct. 31, 2012, and all the benefits accruing therefrom under 35 U.S.C. §119, the contents of which in its entirety are herein incorporated by reference.

BACKGROUND

The present invention relates to distributed systems, and more specifically, to a data processing method and apparatus for distributed systems.

HDFS (Hadoop Distributed File System) is a typical example of a distributed file system. The characteristics and drawbacks of an existing distributed file system are explained below using HDFS as an example.

The HDFS adopts the Master/Slave architecture. An HDFS cluster comprises a name node and a plurality of data nodes. The name node is a master storage node that manages the name space of the entire file system and an access request for a client. At the name node, operations such as opening/closing/renaming a file or catalog can be performed. The data node is a slave storage node that receives a read/write request from the client and performs creation, deletion and replication of a file block based on an instruction from the name node. In order to improve the reliability of storage, a file is generally stored with three replications, and each replication is stored with a fixed block size. An HDFS default data block size is 64 megabytes (MB). According to a replication mechanism of HDFS, segmented blocks are copied to other data nodes respectively based on the number of file replication factors, and then the name node records and saves which data blocks are included in one file replication as well as storage distribution information about being distributed in which data nodes (which is also called metadata information of the file system).

However, existing distributed file systems do not take the actual operation of a distributed program into consideration. Considering the MapReduce program as an example, when a data file stored with small data blocks is processed, more map tasks will be initiated, but relatively large overheads will also arise. When large blocks are adopted, the demands from the client and master server communication will be reduced, as will the space for the metadata which are needed to store by the master server, but available parallel computing resources cannot be utilized effectively. Referring to the example of Table 1, when 1 terabyte (TB) of data is sorted on 20 nodes, suppose each node can run 40 map tasks to the utmost simultaneously, then there are 800 map slots in total. It is seen that when adopting large blocks, only 200 map tasks are utilized in the second round, and the available computing resources cannot be utilized fully.

TABLE 1

| Block Size | running condition of Map tasks | Total time consumed |
|---|---|---|
| 1 GB | First round: using 800 map tasks to sort 800 GB data, taking 80 sec<br>Second round: using 200 map tasks to sort the remaining 200 GB data, taking 80 sec | 80 + 80 = 160 sec |
| 256 MB | In each round, use 800 map tasks to sort 200 GB data, taking 28 sec; 5 rounds in total | 28 * 5 = 140 sec |

Another typical example of a distributed file system is GFS (Google File System). GFS and HDFS have a correspondence relationship in terminology, for example, a master node of GFS corresponds to the name node in HDFS, a GFS block server corresponds to a data node in HDFS, a block in GFS corresponds to a block in HDFS; GFS likewise has the above problems.

Therefore, the prior art still has room to improve, and it is desirable for a data processing method and apparatus for a distributed system.

SUMMARY

According to one aspect of the present invention, there is provided a data processing method for a distributed system, the distributed system comprising a master storage node and multiple slave storage nodes, the method comprising: storing, responsive to a request for writing a data file, multiple replications of the data file on the multiple slave storage nodes, each of the replications being segmented into data blocks of a same size, wherein the sizes of the segmented data blocks of at least two replications are different; storing distribution information of the multiple replications.

According to another aspect of the present invention, there is provided a data processing apparatus for a distributed system, the distributed system comprising a master storage node and multiple slave storage nodes, the apparatus comprising: a data file storing module configured to store, responsive to a request of writing a data file, multiple replications of the data file on the multiple slave storage nodes, each of the replications being segmented into data blocks of a same size, wherein the sizes of the segmented data blocks of at least two replications are different; a distribution information storing module configured to store distribution information of the multiple replications.

By use of the technical solutions of the present application, when storing multiple replications of a data file in a distributed system, the advantages due to storing with different data block sizes can be integrated.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
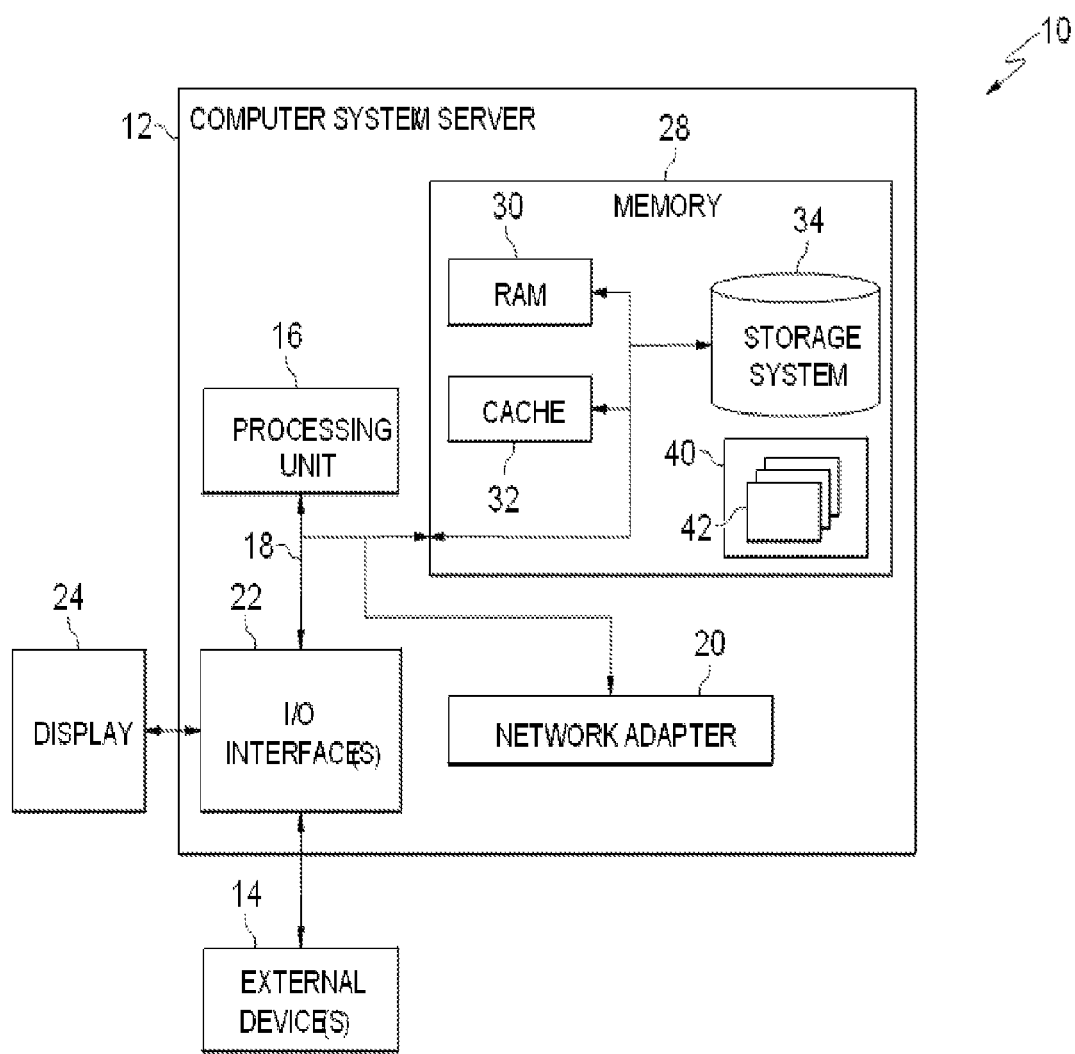
FIG. 1 shows an exemplary computer system/server which is applicable to implement the embodiments of the present invention.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
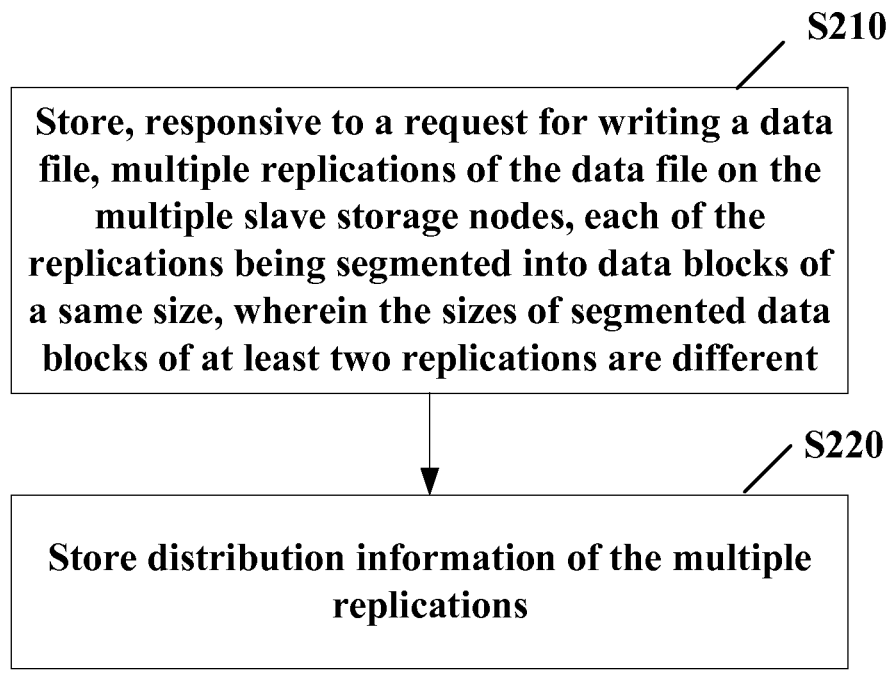
FIG. 2 shows a flowchart of a data processing method for a distributed system according to the embodiments of the present invention.

Now reference is made to FIG. 2, where a flowchart of a data processing method for a distributed system according to the embodiments of the present invention is shown.

In block 210, responsive to a request for writing a data file, multiple replications of the data file are stored on the multiple slave storage nodes, wherein each of the replications is segmented into data blocks of a same size, and the sizes of the segmented data blocks in at least two replications are different. Those skilled in the art would appreciate that as long as two replications with different data block sizes are included, it is possible to select any number of replications with different data block sizes within the allowed range of the number of replications. In one embodiment, the data block sizes between all replications are different. Sizes of data blocks can be customized by a user or set as default values.

When storing multiple replications of the data file on the multiple slave storage nodes, multiple data blocks in one replication may be randomly stored on different data nodes. In one specific embodiment, the size of the data file is 256 MB, the number of replication factors is 3, and the block sizes of the three replications are defined as 64 MB, 128 MB, and 256 MB, respectively. In this embodiment, the first replication file is composed of a 256 MB data block that is stored on data node 7; the second replication file is composed of two 128 MB data blocks that are stored on data nodes 5 and 6, respectively; and the third replication file is composed of 4, 64 MB data blocks that are stored on data nodes 1, 2, 3, and 4, respectively. As an alternative, the multiple data blocks may also be stored on a same data node.

Any existing replication placement strategy can be employed. For example, replications of data blocks may be placed in different racks, with which replications may be distributed in slave storage nodes in a cluster, thereby preventing faults caused by breakdown of the whole rack to a certain extent. Alternatively, another existing replication placement strategy proposes that one replication is placed locally while the remaining replications are placed on different nodes of another rack. As such, due to decrease of the number of racks for distribution, data transfer volume between racks can be reduced. Since replication placement policies are not a focus for improvement in the present application and those skilled in the art can apply any existing replication placement strategy to the present application, they will not be detailed here.

In block 220, distribution information of the multiple replications is stored. In one embodiment, the distribution information of the multiple replications on multiple slave storage nodes is stored on a master storage node. The distribution information may comprise: namespaces for the file and data blocks, mapping relationships from the file to the data blocks, and locations of data blocks included in each replication.

Figure 3:
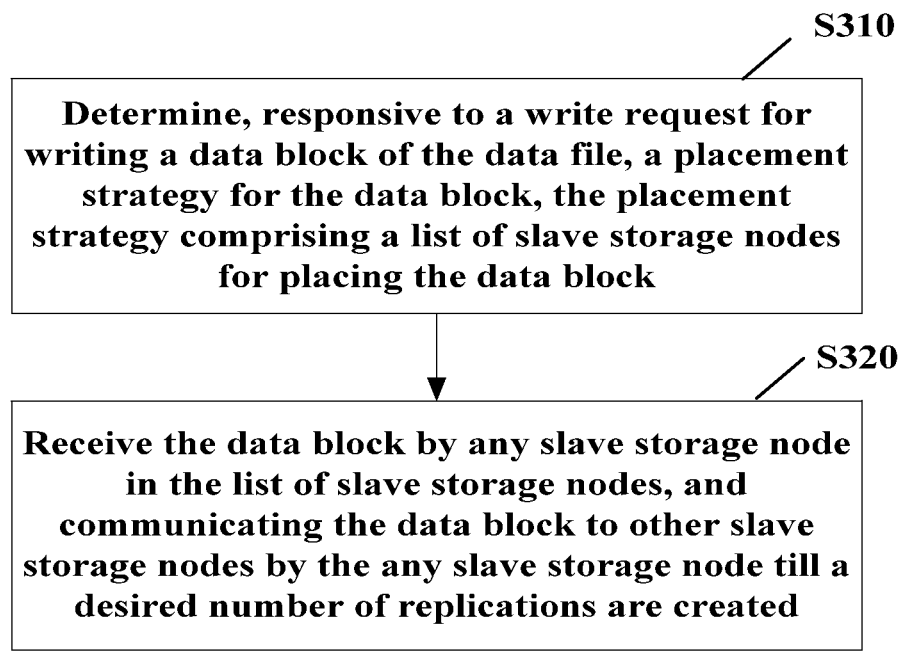
FIG. 3 shows an embodiment of block 210 in FIG. 2 with HDFS as an example.

FIG. 3 shows an embodiment of block 210 in FIG. 2 with HDFS as an example.

In block 310, responsive to a write request for writing a data block of the data file, a placement strategy for the data block is determined, the placement strategy comprising a list of slave storage nodes for placing the data block. For example, a list of slave storage nodes for example includes data node 1, data node 2, etc. In one embodiment, the write request from a client is received by a name node. In this embodiment, when the client writes data into an HDFS file system, the data is initially written into a local temporary file; when the local temporary file accumulates to a size of a data block, the client will obtain a replication placement strategy from the name node to place the replications.

In block 320, the data block is received by any slave storage node in the list of slave storage nodes, and the data block is communicated to other slave storage nodes by the any slave storage node till a desired number of replications are created.

In one embodiment, after data node 1 in the list of slave storage nodes completely receives the data block and writes the received data block into a magnetic disk, the data node 1 communicates the data block to data node 2 until a desired number of replications are created.

In another embodiment, a data block is replicated from a preceding slave storage node to a next in a pipeline. The preceding slave storage node receives the data block from the client in small parts (for example 4 KB) and writes each part into a local magnetic disk, and meanwhile communicates this part to a next slave storage node in the list. The next slave storage node operates similarly, i.e., receiving data in small parts, writing it into a local magnetic disk and communicating it to the last slave storage node (the back coefficient is 3 in this embodiment). The last slave storage node receives the data and stores it locally. Thus, each slave storage node can receive data from the preceding node and meanwhile forwards it to the next node, like a pipeline.

Based on the disclosed information in the present application, those skilled in the art may also contemplate other alternative embodiments, for example, the client may simultaneously communicate data to each storage node in the list of slave storage nodes by itself.

After the each slave storage node completes the write operation, a response message is transmitted to the master storage node.

Figure 4:
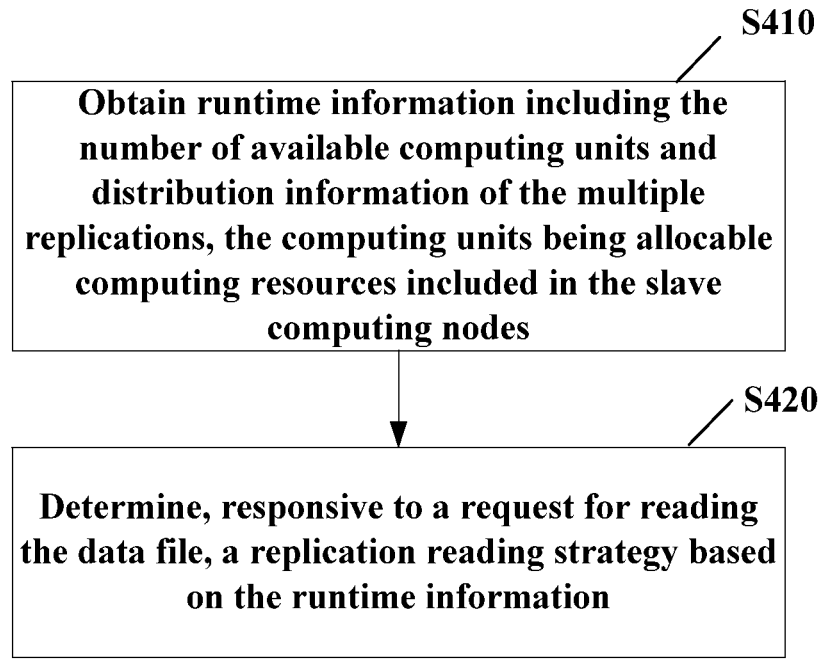
FIG. 4 shows a flowchart of a method of performing a reading-a-file operation in a distributed system according to one embodiment of the present application.

FIG. 4 shows a flowchart of a method of performing a reading-a-file operation in a distributed system according to one embodiment of the present application. The distributed system further comprises a master computing node and multiple slave computing nodes. The master storage node and the master computing node may be either disposed on a same host computer or on different host computers, so disposed are the slave storage nodes and the slave computing nodes. With a MapReduce frame-based distributed system as example, it comprises a master computing node and multiple slave computing nodes. In MapReduce, the master computing node is called JobTracker, and the slave computing nodes are called TaskTrackers. The master computing node is responsible for scheduling all tasks of a job. These tasks are distributed on different slave computing nodes. It is the master computing node monitors execution of the tasks and re-executes failed tasks.

In block 410, runtime information including the number of available computing units and distribution information of the multiple replications is obtained, the computing units being allocable computing resources included in the slave computing nodes.

In one embodiment, the runtime information refers to available computing unit information collected by the master storage node from the master computing node from time to time and distribution information of replications as collected from the master storage node; "from time to time" means collecting the information periodically or non-periodically.

A computing unit refers to at least one allocable computing resource included in a slave computing node, which can be physical or virtual. One example of the computing unit is map slots in Hadoop MapReduce, where the number of map slots of a slave computing node is used to indicate the capacity of the computing resource of the node; therefore, map slot is a resource unit. Each slave computing node will determine its own computing capability so as to determine the total number of computing units included in it. Each slave node (for example, TaskTracker) periodically communicates with the master computing node (for example, JobTracker) through heartbeat to report its own current working state and the number of its own available computing units (i.e., the mount of idle computing units).

In block 420, responsive to a request for reading the data file, a replication reading strategy is determined based on the runtime information. In one embodiment, it is the master storage node that receives the data read request and determines the replication reading strategy.

Based on the replication reading strategy, the client directly communicates with a slave storage node as indicated by the replication reading strategy and reads a replication of the required data block from it.

In one embodiment, responsive to a request for reading the data file, the master computing node can maximize the utilization of the available computing units and the data block of the read replication based on the replication reading strategy as determined based on the runtime information. In one specific embodiment, the block sizes of the first replication R1, second replication R2, and third replication R3 of the data file are 128 MB, 256 MB, and 512 MB, respectively; thus, R1, R2, and R3 have 16, 8, and 4 data blocks, respectively. Then, when 4 computing units are available, using R3 is the best strategy; when 7 computing units are available, using R2 is the best strategy; when 12 computing units are available, using R1 is the best strategy; and when 20 computing units are available, using R1 is the best strategy.

Referring to table 2, in a more specific embodiment, it shows the improvement on time consumption when sorting 1 TB data by applying the present technical solution over the prior art.

TABLE 2

| Block Size | running condition of Map tasks | Total time consumed |
| --- | --- | --- |
| 1 GB | First round: using 800 map tasks to sort 800 GB data, taking 80 sec<br>Second round: using 200 map tasks to sort the remaining 200 GB data, taking 80 sec | 80 + 80 = 160 sec |
| 256 MB | use 800 map tasks to sort 200 GB data, taking 28 sec; 5 rounds in total | 28 * 5 = 140 sec |
| 1 GB | First round: using 800 map tasks to sort 800 GB data (1 GB block), taking 80 sec | 80 + 28 = 108 sec |
| 256 MB | Second round: using 800 map tasks to sort the remaining 200 GB data, (256 MB block) taking 28 sec; 5 rounds in total | |

A replication reading strategy that can maximize the utilization of the available computing units and the data block of the read replication can be determined based on runtime information by a greedy algorithm. Since the greedy algorithm itself is not complex, those skilled in the art would readily design a corresponding computer program based on the information disclosed in the present application, which will not be detailed here.

The above embodiments merely take block size as a reference basis; next, in another embodiment, the replication selection strategy may also be determined by integrating the data block size of the replication and a replication obtaining cost. In one embodiment, there may further comprise a plurality of sub-operations:

Sub-operation 1: determine a set of replications that maximize the utilization of the available computing units. For example, when the number of available computing units is 7, both replication R2 (8 blocks in total) and replication R1 (16 blocks in total), which have more than 7 blocks, can fully utilize the 7 computing resources.

Sub-operation 2, determine a characteristic value of each replication in the set of replications based on the size of data block in each replication and an obtaining cost of the replication; and determine a replication to read based on the characteristic value. In another specific embodiment, the obtaining cost is determined based on at least one of: busy degree of the slave storage node where the replication is located; a distance from the slave storage node where the replication is located to a slave computing node where the available computing unit is located.

In a specific embodiment, a replication characteristic value may be calculated for each desired replication, the replication characteristic value=size of the replication/(distance*value of busy degree of the data node), wherein the distance value=the number of exchanges between computing nodes and data nodes+1, wherein value of busy degree of the data node=the number of read/write requests as received by the data node from the HDFS. Then, a replication with the maximal replication characteristic value is selected preferably. By this equation, the accessibility degree of the replication and use of the network and hardware resources are balanced while maximizing the utilization of the largest replication.

In a specific embodiment, a cluster comprises 100 nodes and two layers of exchangers. The replication coefficient is set as 3, the block sizes of the replications are 512 MB, 256 MB, and 128 MB, respectively. The characteristic values as shown in FIG. 3 are calculated based on the previously mentioned calculation manner. It is found that for the slave computing node 1, the replication characteristic value with a block size of 512 MB is the largest; while for the slave computing node 2, the replication characteristic value with a block size of 256 MB is the largest.

TABLE 3

|  | Set of replications | Set of replication characteristic values | The size of the replication data block for the largest replication characteristic value |
|---|---|---|---|
| node 1 | {512, 256, 128} | {512/(1 * 10), 256/(1 * 8), 128/(2 * 5)} | 512 |
| node 2 | {512, 256, 128} | {512/(4 * 8)}, 256/(1 * 10), 128/(1 * 8)} | 256 |

At this pint, the task execution diagram is specified below:
Node 1: |- - - - - - - - - - - - - - - - - - - -first round map 512 M- - - - - - - - - - - - - - - - - - - - - - - -|
Node 2: |- - - - - - - -first round map 256 M- - - - - -|

Figure 5:
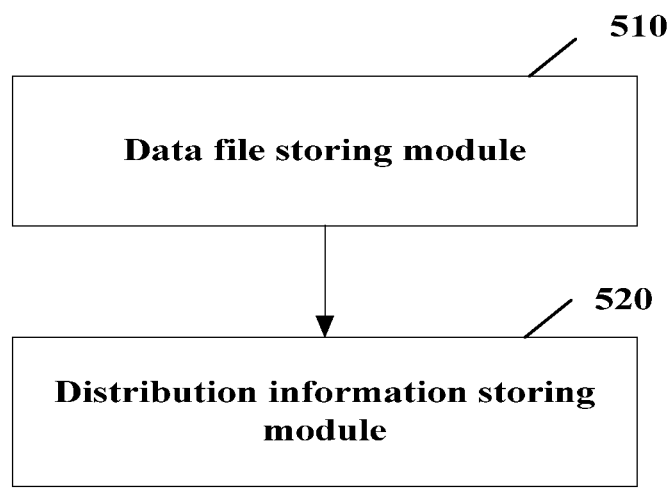
FIG. 5 shows a schematic block diagram of a data processing apparatus for a distributed system according to the embodiments of the present invention.

FIG. 5 shows a data processing apparatus for a distributed system, the distributed system comprising a master storage node and multiple slave storage nodes, the apparatus as shown in FIG. 5 comprising:

a data file storing module 510 configured to, responsive to a request for writing a data file, store multiple replications of the data file on the multiple slave storage nodes, each of the replications being segmented into data blocks of a same size, wherein the sizes of segmented data blocks of at least two replications are different;

a distribution information storing module 520 configured to store distribution information of the multiple replications.

In one embodiment, the distributed system further comprises a master computing node and multiple slave computing nodes, the apparatus further comprising: a module configured to obtain runtime information including the number of available computing units and distribution information of the multiple replications, the computing units being allocable computing resources included in the slave computing node; and a module configured to determine a replication reading strategy based on the runtime information responsive to a request for reading the data file.

In one embodiment, the replication reading strategy is able to maximize the utilization of the available computing unit and the data block of the read replication. In one embodiment, the replication reading strategy may be determined using the greedy algorithm to maximize the utilization of the available computing unit and the data block of the read replication.

In one embodiment, the module configured to determine a replication reading strategy based on the runtime information responsive to a request for reading the data file comprises: a module configured to determine a set of replications that maximize utilization of the available computing units; a module configured to determine a characteristic value of each replication in the set of replications based on the data block size of each replication and an obtaining cost of the replication; and a module configured to determine a replication to read based on the characteristic value.

In one embodiment, the obtaining cost is determined at least using one of the following manners: busy degree of the slave storage node where the replication is located; a distance from the slave storage node where the replication is located to a slave computing node where the available computing unit is located.

In another embodiment, the data file storing module 510 comprises a module configured to, responsive to a write request for writing into a data block of the data file, a replication placement strategy of the data block, the placement strategy comprises a list of slave storage nodes for storing the data block; a module configured to receive the data block from any slave storage node in the list of storage nodes and communicate the data block through the any slave storage node to other slave storage nodes till a desired number of replications are created.

In one embodiment, there further comprises a module configured to store multiple data blocks included in one replication on different slave storage nodes. In another embodiment, the size of the block size is configurable.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A data processing method for a distributed system, the distributed system comprising a master storage node and multiple slave storage nodes, the method comprising:
storing, responsive to a request for writing a data file, multiple replications of the data file on the multiple slave storage nodes, each of the replications being segmented into data blocks of a same size, wherein the sizes of the segmented data blocks of at least two replications are different;
storing distribution information of the multiple replications, wherein the distribution information includes namespace information;
periodically obtaining runtime information including a number of available computing units and distribution information of the multiple replications, the computing units being allocable computing resources included in the slave computing nodes;
responsive to a request for reading the data file, determining a replication reading strategy based on the runtime information to select one of the multiple replications to read from the multiple replications, wherein the determining a replication reading strategy comprises
determining a characteristic value of each replication in the set of replications based on the size of the data block of each replication, a busy degree of the slave storage node where the replication is located, and a distance from the slave storage node where the replication is located to the slave computing node where the available computing units are located;
determining a replication to read based on the characteristic value, wherein the determining the characteristic value is determined according to the following calculation:

characteristic value=size of the data block of each replication/[(distance from the slave storage node where the replication is located to the slave computing node where the available computing units are located)*(a value of a busy degree of the slave storage node where the replication is located)];

determining, responsive to a write request for writing a data block of the data file, a placement strategy for the data block, the placement strategy comprising a list of slave storage nodes for placing the data block, the list being a subset of all of the storage nodes of the distributed system; and
receiving the data block by any slave storage node in the list of slave storage nodes and communicating the data block to other slave storage nodes by the any slave storage node until a desired number of replications are created.

2. The method according to claim 1, wherein the replication reading strategy is configured to maximize utilization of the available computing units and the size of the data block of the read replication.

3. The method according to claim 2, wherein the replication reading strategy is determined using a greedy algorithm to maximize the utilization of the available computing units and the size of the data block of the read replication.

4. The method according to claim 1, wherein determining the replication reading strategy based on the runtime information comprises:
determining a set of replications that maximize utilization of the available computing units and obtaining a cost of each replication.

5. The method according to claim 1,
wherein the busy degree is based on a number of received read/write requests.

6. The method according to claim 1, wherein multiple data blocks included in a replication are stored on different slave storage nodes.

7. The method according to claim 1, wherein the size of the data blocks is configurable.

8. A data processing apparatus for a distributed system, the distributed system comprising a master storage node and multiple slave storage nodes, the apparatus comprising:
a data file storing module configured to store, responsive to a request of writing a data file, multiple replications of the data file on the multiple slave storage nodes, each of the replications being segmented into data blocks of a same size, wherein the sizes of the segmented data blocks of at least two replications are different;
a module configured to periodically obtain runtime information including a number of available computing units and distribution information of the multiple replications, the computing units being allocable computing resources included in the slave computing nodes;
a module configured to determine, responsive to a request for reading the data file, a replication reading strategy based on the runtime information to select one of the replications to read from the multiple replications, wherein the determining the replication reading strategy comprises
determining a characteristic value of each replication in the set of replications based on the size of the data block of each replication, a busy degree of the slave storage node where the replication is located, and a distance from the slave storage node where the replication is located to the slave computing node where the available computing units are located;
determining a replication to read based on the characteristic value, wherein the determining the characteristic value is determined according to the following calculation:

characteristic value=size of the data block of each replication/[(distance from the slave storage node where the replication is located to the slave computing node where the available computing units are located)*(a value of a busy degree of the slave storage node where the replication is located)];

determining, responsive to a write request for writing a data block of the data file, a placement strategy for the data block, the placement strategy comprising a list of slave storage nodes for placing the data block, the list being a subset of all of the storage nodes of the distributed system; and
receiving the data block by any slave storage node in the list of slave storage nodes and communicating the data block to other slave storage nodes by the any slave storage node until a desired number of replications are created.

9. The apparatus according to claim 8, wherein the replication reading strategy is configured to maximize utilization of the available computing units and the data block of the read replication.

10. The apparatus according to claim 9, wherein the replication reading strategy is determined using a greedy algorithm to maximize the utilization of the available computing units and the data block of the read replication.

11. The apparatus according to claim 8, wherein the module configured to determine, responsive to a request for reading the data file, the replication reading strategy based on the runtime information comprises:

a module configured to determine a set of replications that maximize utilization of the available computing units and obtain a cost of each replication.

12. The apparatus according to claim 8, wherein the busy degree is based on a number of received read/write requests.

13. The apparatus according to claim 8, further comprising:

a module configured to store multiple data blocks included in a replication on different slave storage nodes.

14. The apparatus according to claim 8, wherein the size of the data blocks is configurable.

\* \* \* \* \*